United States Patent
Nonay et al.

(10) Patent No.: US 6,618,494 B1
(45) Date of Patent: Sep. 9, 2003

(54) OPTICAL DISTORTION CORRECTION IN DIGITAL IMAGING

(75) Inventors: Barry A. Nonay, Edmonton (CA); Cynthia G. Pachal, St. Albert (CA)

(73) Assignee: Wuestec Medical, Inc., Theodore, AL (US)

( * ) Notice: Subject to any disclaimer, the term of this patent is extended or adjusted under 35 U.S.C. 154(b) by 0 days.

(21) Appl. No.: 09/449,174

(22) Filed: Nov. 24, 1999

Related U.S. Application Data
(60) Provisional application No. 60/110,123, filed on Nov. 27, 1998.

(51) Int. Cl.[7] .................................................. G06K 9/00
(52) U.S. Cl. ....................... 382/132; 382/275; 382/287; 382/289; 378/207
(58) Field of Search ........................ 348/188; 250/207; 382/131, 132, 254, 255, 275, 287, 289; 378/207

(56) References Cited

U.S. PATENT DOCUMENTS

| | | | |
|---|---|---|---|
| 3,860,817 A | 1/1975 | Carmean | 250/320 |
| 4,412,346 A | 10/1983 | Takenouti et al. | 378/181 |
| 4,684,565 A | 8/1987 | Abeles et al. | 428/220 |
| 4,761,805 A | 8/1988 | Sebring | 378/181 |
| 4,821,727 A | 4/1989 | Levene et al. | 128/653 |
| 4,890,313 A | 12/1989 | Lam et al. | 378/189 |
| 4,924,487 A | 5/1990 | Nishiki | 378/190 |
| 4,979,198 A | 12/1990 | Malcolm et al. | 378/102 |
| 4,987,307 A | 1/1991 | Rizzo et al. | 250/368 |
| 4,995,068 A | 2/1991 | Chou et al. | 378/189 |
| 5,090,042 A | 2/1992 | Bejjani et al. | 378/99 |
| 5,211,165 A | 5/1993 | Dumoulin et al. | 128/653.1 |
| 5,235,528 A | * 8/1993 | Silver et al. | 250/363.09 |
| 5,675,380 A | * 10/1997 | Florent et al. | 348/247 |
| 5,748,768 A | * 5/1998 | Sivers et al. | 378/21 |
| 5,825,947 A | * 10/1998 | Sasaki et al. | 382/321 |
| 6,007,243 A | * 12/1999 | Ergun et al. | 378/197 |
| 6,353,657 B1 | 3/2002 | Bayrock et al. | |
| 6,483,893 B1 | 11/2002 | Achtnig et al. | |

FOREIGN PATENT DOCUMENTS

| | | | |
|---|---|---|---|
| CA | 2179616 | 7/1994 | G03B/41/16 |

OTHER PUBLICATIONS

"Automated Distortion Correction of X-ray Image Intensifier Images" by David Reimann, IEEE 1993.*

"A New Method for Distortion Correction of Electronic Endoscope Images" by Hideaki Haneishi, IEEE Transactions on Medical Imaging, vol. 14, No. 3 Sep. 1995.*

* cited by examiner

*Primary Examiner*—Jon Chang
*Assistant Examiner*—Charles Kim
(74) *Attorney, Agent, or Firm*—Fulbright & Jaworski L.L.P.

(57) ABSTRACT

A system and method for digital x-ray imaging may correct distortion in a digital image by determining the cell size of a grid. A rotational correction may be applied to the cell to correct for distortion that might result from improper alignment between an imaging sensor used to capture the image and the image itself. Stretch factors for the pixels are calculated and applied to the cells of the grid to provide cells of consistent size. The calculated stretch factors may be applied to subsequent images to provide an efficient method for optical distortion correction.

22 Claims, 6 Drawing Sheets

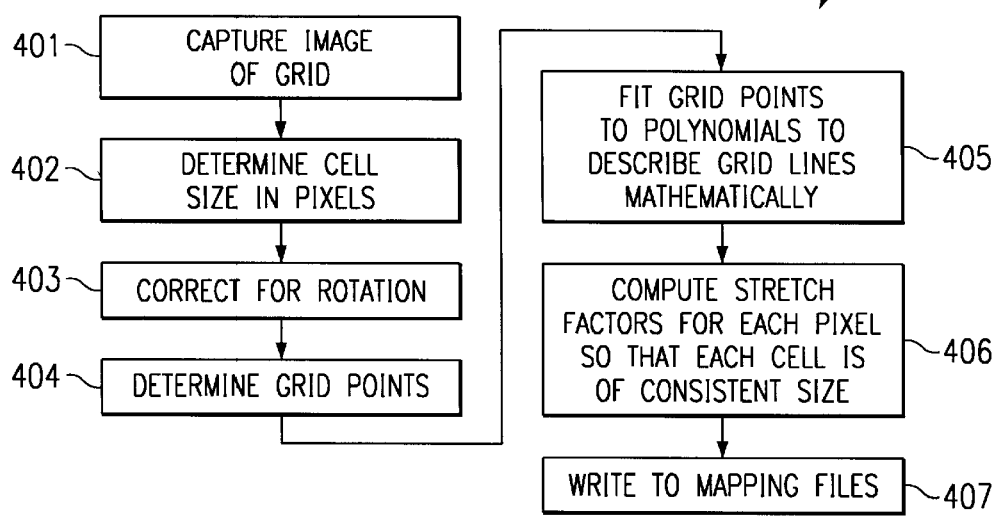
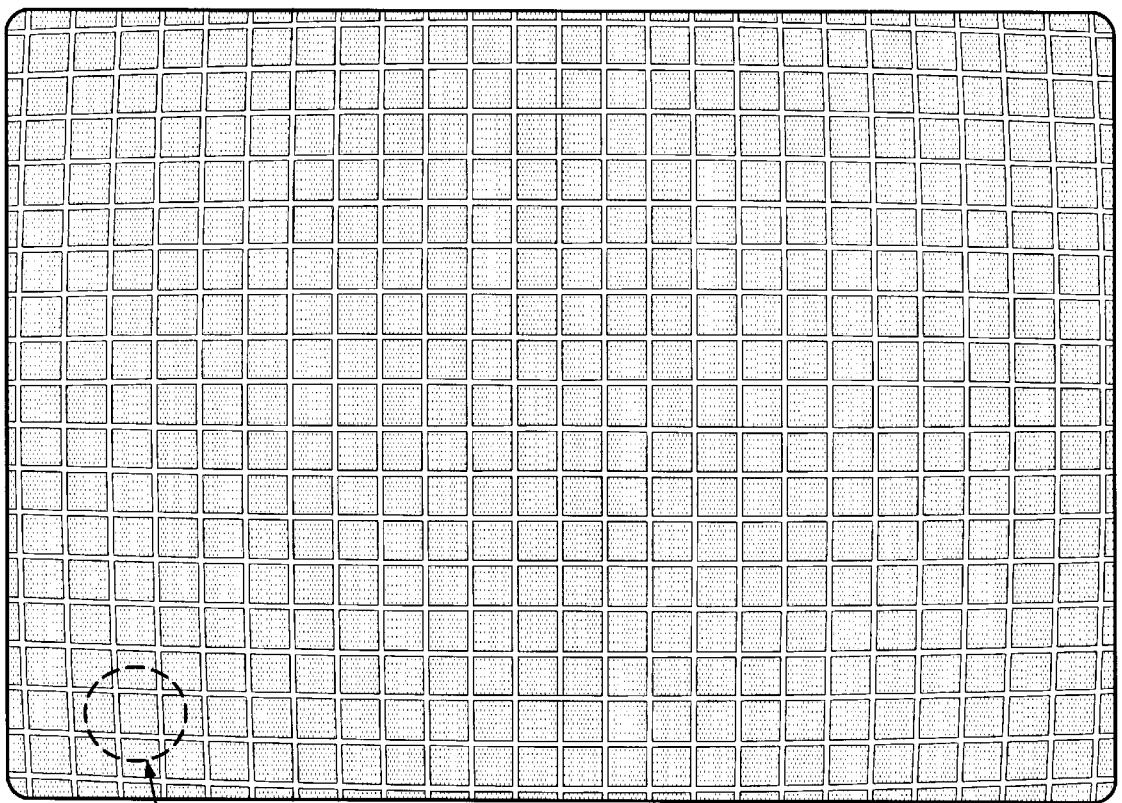

OPTICAL DISTORTION CORRECTION IN DIGITAL IMAGING

RELATED APPLICATIONS

The present application claims the benefit of U.S. Provisional Application No. 60/110,123, filed Nov. 27, 1998, the disclosure of which is incorporated herein by reference. The present application is related to concurrently filed U.S. patent application Ser. No. 09/449,173 (issued as U.S. Pat. No. 6,339,633), entitled "DIGITAL HIGH RESOLUTION X-RAY IMAGING", the disclosure of which is incorporated herein by reference. The present application is related to concurrently filed U.S. patent application Ser. No. 09/103,402 (issued as U.S. Pat. No. 6,353,730), entitled "IMAGE REDIRECTION AND OPTICAL PATH FOLDING", the disclosure of which is incorporated herein by reference.

TECHNICAL FIELD

The present invention relates to high resolution digital imaging and in particular to a system and method for correcting curvilinear distortion in digital images captured using optical lenses.

BACKGROUND

When images are captured using digital devices, such as a digital charge coupled device (CCD) camera used in x-ray imaging, an optical lens (or lens assembly) is used to focus the image onto the surface of the device. Whenever a lens (or a lens assembly) is used, the image suffers from distortion which causes the image to increasingly shrink in size as it proceeds outwards from the center because of the curvilinear nature of the lens. This type of optical distortion is referred to as barrel distortion as the straight edges of a rectangle appear to be curved in the shape of a barrel.

There are many applications where the use of non-distorted digital images is desirable. For example, a digitally captured x-ray image may be used to measure the distance between two vertebrae in the spine of an individual. In such applications, it is desirable to have a non-distorted image, so that a care provider can accurately measure the distance between the vertebrae and possibly observe the change in the distance of the vertebrae over a period of time. In a digital image having the distortion as discussed above, it is not possible to get such desirable accurate images. Thus, it is desirable to remove barrel distortion in order that accurate measurements may be made directly from a captured image.

Another problem with barrel distortion occurs when two images of different portions of the same object are to be stitched or joined together. Whenever barrel distortion is present, the images cannot be overlapped to produce a final seamless image. If the images are curved at the corners as discussed above, then it is very difficult to accurately combine or join the images to provide a combined or complete image. Thus, it is also desirable to remove barrel distortion whenever two or more images of the same object are to be stitched or combined together to form a single image.

Therefore, in one camera systems, it is desirable to correct optical distortion to provide images which may be used for different purposes, for example, making accurate measurements and in multi-camera systems, it may be desirable to correct optical distortion so that the different images may be combined together to form a seamless combined image.

Moreover, in many cases, the barrel distortion may not be symmetric. This may occur when the lens used is not symmetric. It may also occur when two or more lens (or lens assemblies) which are not perfectly aligned within the field of view are used. When barrel distortion is not symmetric, the correction depends upon the rotation of the device relative to the imaging surface.

Existing barrel correction methods are very computation intensive and require a lot of processing time to correct optical distortion. Such algorithms may not be suitable in various applications especially those applications which require multiple images to be acquired in a short period of time. For example, in diagnostic x-ray imaging systems, it may be desirable to acquire multiple images in a short period of time in order to reduce the patient's exposure to x-ray radiation.

Therefore, there is a need in the art for a system and method for accurately and efficiently correcting optical distortion in digital images.

SUMMARY OF THE INVENTION

These and other objects, features and technical advantages are achieved by an imaging system and method which utilizes a calibration image to correct for optical distortion, such as barrel distortion, in an optical image.

In the preferred embodiment, the calibration image is placed over an imaging surface. For example, the calibration image may be a film with regularly spaced horizontal and vertical grid-lines etched onto the film. The imaging surface may be an imaging screen, such as a fluorescent phosphor screen used in x-ray imaging. The image of the calibration image is captured by an imaging sensor, such as a CCD camera.

In the preferred embodiment, the cell size of a particular cell is determined. Because the optical lenses tend to be fairly flat in the center, the center most cell of the image has the least distortion. Therefore, preferably the center most cell of the image is selected for determining the cell size. Moreover, because the optical plane of the imaging sensor and the calibration image may not be properly aligned with each other, therefore, in the preferred embodiment, the determined cell size may then be corrected for rotational differences between the imaging sensor and the calibration image. The factor by which each pixel is to be stretched in the preferred embodiment to remove the barrel distortion in either the x direction or the y direction is then determined. The stretch factor is calculated so that each cell in the resultant image is of consistent size. The stretch factors may be stored in mapping files associated with a processor based system, such as a personal computer. Once calculated and stored, these stretch factors may be applied to subsequent images to correct optical distortion in such images quickly and efficiently.

Accordingly, it is a technical advantage of a preferred embodiment of the present invention, to remove optical distortion from digital images.

It is another technical advantage of a preferred embodiment of the present invention to quickly and efficiently correct optical distortion.

It is still another technical advantage of a preferred embodiment of the present invention to facilitate combining of images.

It is yet another technical advantage of a preferred embodiment of the present invention to provide stretch factors which may be stored on a computer system to correct optical distortion in digital images.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 shows a flowchart for correcting optical distortion in a digital image;

FIG. 2 shows an image of grid lines with barrel distortion;

DETAILED DESCRIPTION

FIG. 1 shows a flowchart for correcting optical distortion in a digital image. In step 401, a calibration image is captured. In the preferred embodiment, the calibration image is a film with regularly spaced horizontal and vertical grid lines etched onto the film. The squares of the grid are preferably the same size across the entire captured image. The calibration image may be placed over an imaging screen, such as a fluorescent phosphor screen used in x-ray imaging. The calibration image is preferably captured by an imaging sensor, such as a CCD camera. In the preferred embodiment, this image is captured by focusing the image by a lens (or a lens assembly).

The use of a CCD camera to capture an image, for example, in an x-ray imaging system is disclosed in the above mentioned U.S. Patent Application, entitled "IMAGE REDIRECTION AND OPTICAL PATH FOLDING", the disclosure of which is hereby incorporated herein by reference. Other known methods for capturing a digital image may also be used, if desired.

In step 402, the size of a cell (or square) of the grid is determined preferably in terms of the number of pixels. Because of the nature of optical lens, in an image of a square grid with barrel distortion, the amount of distortion is the smallest at the center of the image and increases towards each edge. Therefore, in the preferred embodiment, the cell size of the center cell is determined. The determined cell size may be used to make other cells in the image the same size as the center most cell.

FIG. 2 shows an image of grid lines with barrel distortion. A review of the image of FIG. 2 reveals that due to the barrel distortion, the bottom most horizontal grid line is curved upwards on the left hand side. The same horizontal line goes downward towards the center and then starts to curve upwards towards the right hand side of the image. Similar distortion effects may be observed along the upper most horizontal line, the leftmost vertical line and the right most vertical line.

Figure 3:
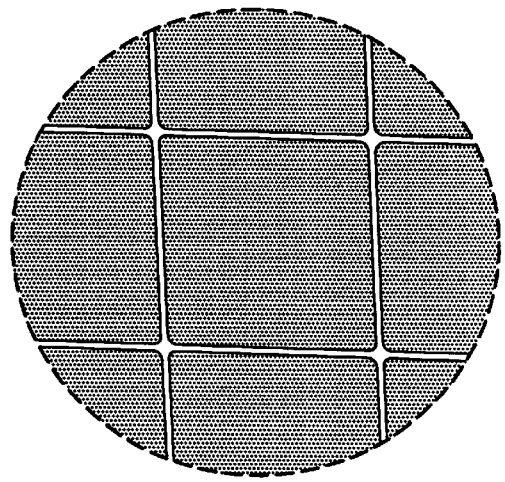
FIG. 3 shows a cell with barrel distortion.

FIG. 3 shows a cell with barrel distortion. The barrel distortion shows the fact that the lines of the grid do not fall exactly on the pixel boundaries and that the lines actually have a width and a height. In a cell with barrel distortion, the distance between adjacent grid lines varies from the top to the bottom and from the left to the right. To correct for barrel distortion, it is desirable to know the number of pixels between adjacent grid lines in a cell without distortion. The cell size is the number of pixels between adjacent grid lines in a cell without distortion. In the preferred embodiment, the cell size is the number of pixels from the center of one grid line to the center of another grid line, both horizontally and vertically. Measurements are made in each of the x and y directions by determining the distance between the closest vertical and horizontal grid lines respectively. Once the cell size for a cell with the least amount of distortion is measured, the pixels in the distorted cells may be stretched to the determined number of pixels.

Moreover, the cell size may vary between different imaging sensors in a multi camera system due to differing focal lengths. The distance from the imaging surface to the imaging sensor may not be the same for all imaging sensors. Images captured with imaging sensors which are further away have a smaller cell size than images captured with imaging sensors which are closer.

Figure 4:
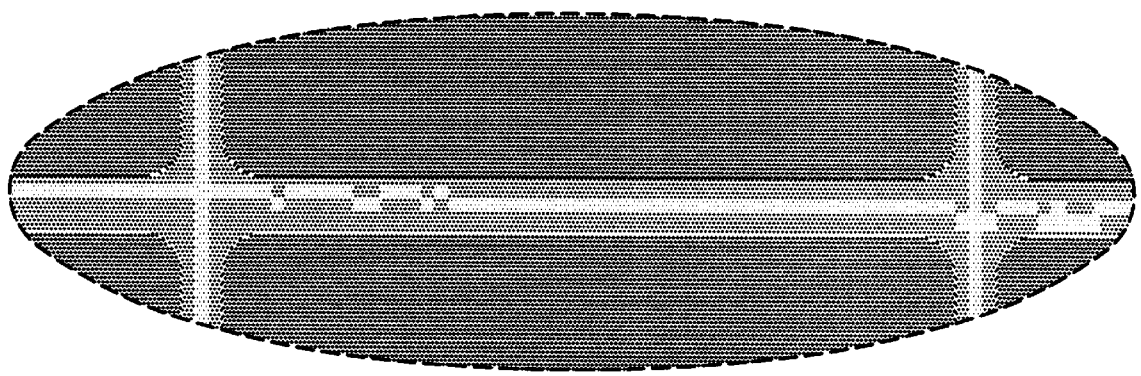
FIG. 4 shows a line with barrel distortion.
Figure 5:
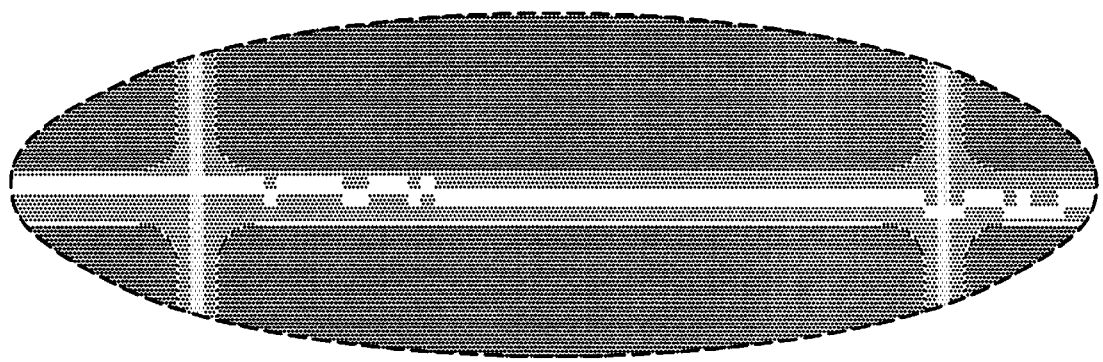
FIG. 5 shows the line of FIG. 4 with maximum pixel intensities highlighted.

FIG. 4 shows an image of a grid line with barrel distortion. As can be seen from the FIGURE, the line does not have a uniform center. Therefore, in order to determine the center of the line, in the preferred embodiment, a sampling and fitting technique discussed below in detail is used. FIG. 5 shows the line of FIG. 4 with maximum pixel intensities highlighted. The center of the grid line is assumed to be at the pixels which have the maximum intensity.

An accurate measurement of the center of a grid line may be obtained by fitting sample data points to a line preferably using the method of least squares. For example, the following 77 points are obtained from FIG. 5 for the pixels with maximum intensity, using the upper left corner of the image as the origin and with the y coordinate increasing downwards and the x coordinate increasing towards the right: (0, 8) (1, 8), (2, 8), (3, 8), (4, 8), (5, 8), (6, 8), (7, 8), (8, 8), (9, 8), (10, 8), (11, 8), (12, 8), (13, 8), (14, 8), (15, 8), (16, 8), (17,9), (18, 8), (19, 8), (20, 8), (21, 8), (22, 8), (23, 9), (24, 9), (25, 8), (26, 8), (27, 8), (28, 9), (29, 8), (30, 9), (31, 9), (32, 9), (33, 9), (34, 9), (35, 9), (36, 9), (37, 9), (38, 9), (39, 9), (40, 9), (41, 9), (42, 9), (43, 9), (44, 9), (45, 9), (46, 9), (47, 9), (48, 9), (49, 9), (50, 9), (51, 9), (52, 9), (53, 9), (54, 9), (55, 9), (56, 9), (57, 9), (58, 9), (59, 9), (60, 9), (61, 9), (62, 9), (63, 9), (64, 9), (65, 9), (66, 10), (67, 10), (68, 10), (69, 9), (70, 9), (71, 9), (72, 10), (73, 9), (74, 10), (75, 10), (76, 9).

The equation of a line that would give the least amount of error could be determined by fitting the line to a plurality of sample points taken along the line. The method of least squares for line fitting is described next.

The equation of a line may be written as:

$$y = m \cdot x + b \quad \text{(Equation 1)}$$

where m is the slope of the line and b is the y-intercept. For the above example, in order to obtain the values of m and b the system of linear equations of the form:

$$Au = v \quad \text{(Equation 2)}$$

is solved,
where A is a 2×77 matrix, u is a vector of 2 unknowns (b and m), and v is a vector of 77 points.

$$\begin{bmatrix} 1 & 0 \\ 1 & 1 \\ \vdots & \vdots \\ 1 & 76 \end{bmatrix} \times \begin{bmatrix} b \\ m \end{bmatrix} = \begin{bmatrix} 8 \\ 8 \\ \vdots \\ 9 \end{bmatrix}$$

The size of matrix A depends on the number of sample data points. Since in the above example, 77 data points are used, A is a 2×77 matrix. Similarly, the size of vector v depends on the number of sample data points. This is an over-determined linear system as there are more equations than the number of unknowns. Using the method of least squares, multiply both sides of equation 2 by the transpose of A, i.e., $A^T$, where:

$$A^T = \begin{bmatrix} 1 & 1 & \cdots & 1 \\ 0 & 1 & \cdots & 76 \end{bmatrix}$$

$$A^T Au = A^T v \quad \text{(Equation 3)}$$

Define A' as $A^T A$, v' as $A^T v$:

$$A'u = v',$$

where $$A' = \begin{bmatrix} \sum_{i=0}^{n-1} l \sum_{i=0}^{n-1} x_i \\ \sum_{i=0}^{n-1} x_i \sum_{i=0}^{n-1} x_i^2 \end{bmatrix}, \quad u = \begin{bmatrix} b \\ m \end{bmatrix}, \quad \text{and } v' = \begin{bmatrix} \sum_{i=0}^{n-1} y_i \\ \sum_{i=0}^{n-1} x_i \cdot y_i \end{bmatrix} \quad \text{(Equation 4)}$$

Solve equation 4 to get:

$$n \cdot b + m \cdot \sum_{i=0}^{n-1} x_i = \sum_{i=0}^{n-1} y_i \quad \text{(Equation 5)}$$

$$b \cdot \sum_{i=0}^{n-1} x_i + m \cdot \sum_{i=0}^{n-1} x_i^2 = \sum_{i=0}^{n-1} x_i \cdot y_i \quad \text{(Equation 6)}$$

Rewriting equation 5 to solve for b and substituting into equation 6 to solve for m:

$$b = \frac{\sum_{i=0}^{n-1} y_i - m \cdot \sum_{i=0}^{n-1} x_i}{n} \quad \text{(Equation 7)}$$

$$m = \frac{n \cdot \sum_{i=0}^{n-1} x_i \cdot y_i - \sum_{i=0}^{n-1} x_i \cdot \sum_{i=0}^{n-1} y_i}{n \cdot \sum_{i=0}^{n-1} x_i^2 - \left(\sum_{i=0}^{n-1} x_i\right)^2} \quad \text{(Equation 8)}$$

For the 77 sample data points of the above example:

$$m = \frac{(77 \times 26.413) - (2926 \times 673)}{(77 \times 149{,}226) - (2926)^2} = 0.022057$$

$$b = \frac{673 - (0.0022057 \times 2926)}{77} = 7.9021$$

The equation of the line is:

$$y = (0.022057 \times x) + 7.9021 \quad \text{(Equation 9)}$$

Figure 6:
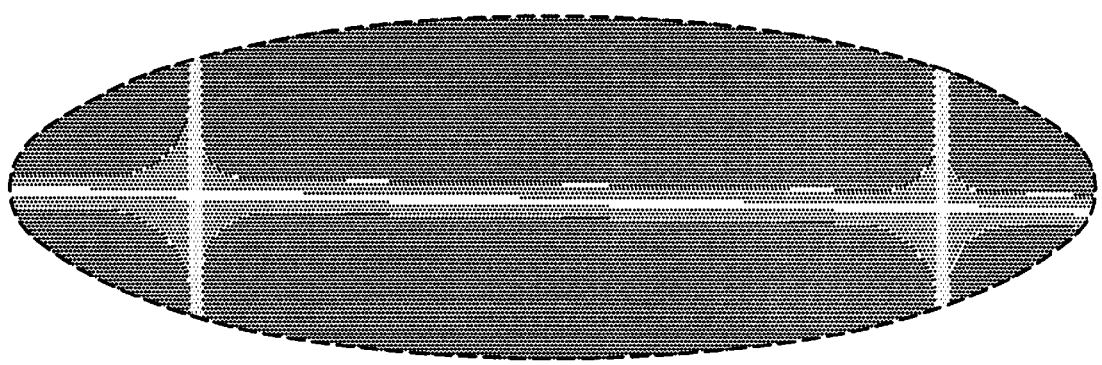
FIG. 6 shows the line of FIG. 4 fitted by the method of least squares.

FIG. 6 shows an image of the line of FIG. 4 fitted with equation 9. The more the sample data points the more accurate the result. Therefore, the most accurate result is obtained when the samples are taken at successive pixels along the line, i.e. the most accurate result for line fitting is obtained at a step size of 1. However, time and memory requirements are increased with the number of sample data points. Therefore, if time or memory allocation is a problem, a higher step size may be used to accommodate the time and memory constraints of the system. As the step size increases, the number of points decreases and so does the accuracy. Table I shows the values of the slope and y-intercept for various step sizes:

TABLE I

Line coefficients as a function of step size

| Step Size | Number of Points | Slope (m) | Difference | Y-Intercept (b) | Difference |
|---|---|---|---|---|---|
| 1 | 77 | 0.022057 | +0.000000 | 7.9021 | +0.0000 |
| 2 | 38 | 0.020516 | −0.001541 | 7.9310 | +0.0289 |
| 3 | 25 | 0.021795 | −0.000262 | 7.9318 | +0.0297 |
| 4 | 19 | 0.023684 | +0.001627 | 7.8648 | −0.0373 |
| 5 | 15 | 0.022143 | −0.000086 | 7.8698 | −0.0323 |
| 10 | 7 | 0.021429 | −0.000628 | 7.7357 | −0.1664 |
| 15 | 5 | 0.033333 | +0.011276 | 7.3333 | −0.5688 |

An estimate of the cell size in pixels is desirable to determine the maximum number of cells for each dimension of the image, and also to bound the search parameters when determining intersection points of grid lines as described below with regard to step 404 of the flowchart of FIG. 1. In order to obtain the initial estimate of the cell size, the dimensions of the central cell of the image are estimated by detecting the grid lines that bound the center cell, i.e. the right and left vertical grid lines and the top and bottom horizontal grid lines of the center cell. The cell size in the x direction is preferably determined by starting in the center pixel of the center row of the image and finding a vertical line to the left of the center pixel and finding another vertical line to the right of the center pixel. A vertical line is detected by incrementally sampling the pixel intensities along the center row from the middle until a pixel is detected whose intensity value exceeds a minimum threshold. False detection of grid lines may occur under the following conditions:

a) A bad pixel is encountered. Bad pixels which are caused by defects in the imaging sensor are expected to be removed by dark frames and flat fields which is well known to one of ordinary skill in the art.

b) A blemish exists on the grid being imaged.

c) The penumbra of the grid line exceeds the minimum threshold.

d) The middle row of the image is at or close to the center of a horizontal grid line.

In order to protect against false detection, it is desirable to satisfy several conditions. First, the first peak, i.e. the pixel with the highest intensity value, must be sufficiently far enough away from the middle of the image. In the worst case, a vertical line lies exactly along the center axis. Second, consecutive increments must place the maximum intensity value at or very near to the same location. When both of these conditions have been met, the line is followed in both opposing directions using sampling. Third, the number of valid sample points must be at least half of the possible sample points. Whenever these conditions are not met, the search continues with the next increment. Fourth, whenever the incremented length exceeds the image dimension, the search is started over again at a scan line further away from the middle than the previous one.

Figure 7A:
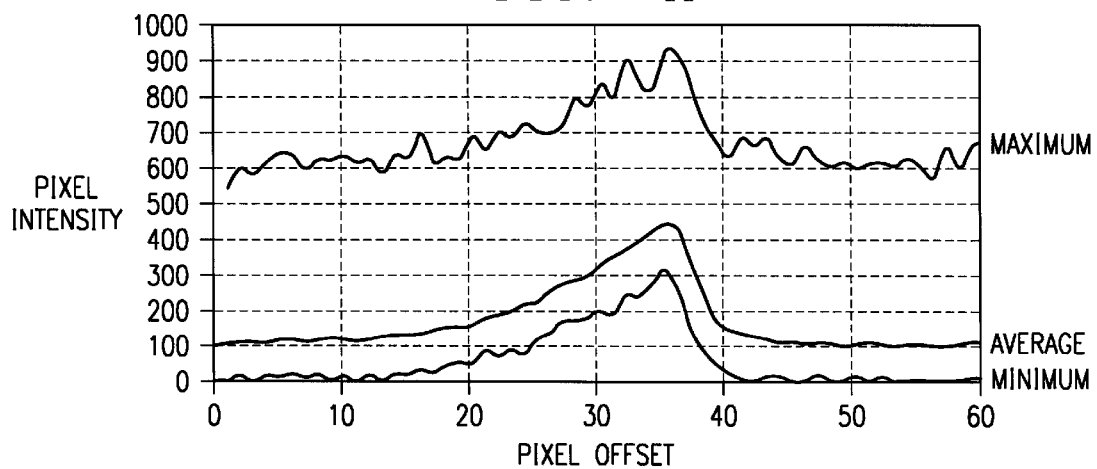
FIGS. 7A, 7B, 7C, and 7D show charts for characteristics of grid line detection.
Figure 7B:
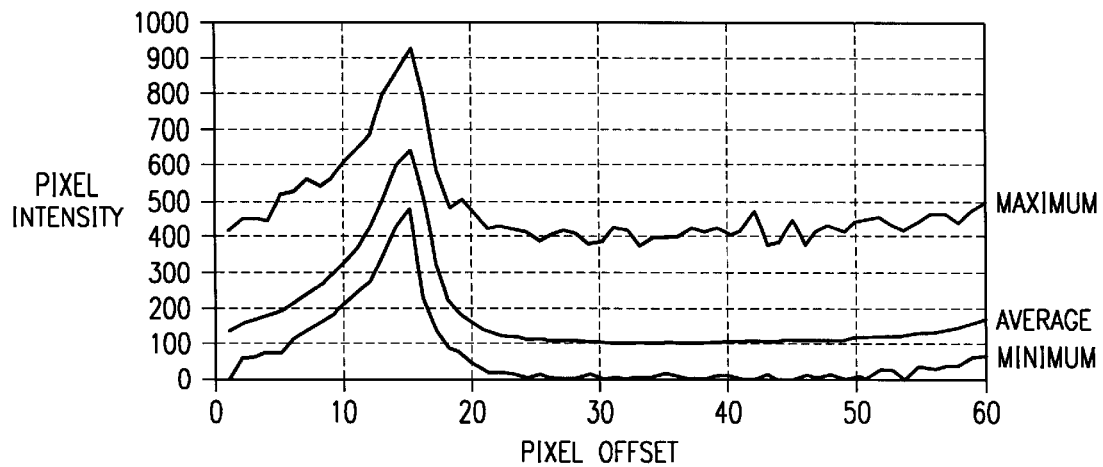
Figure 7C:
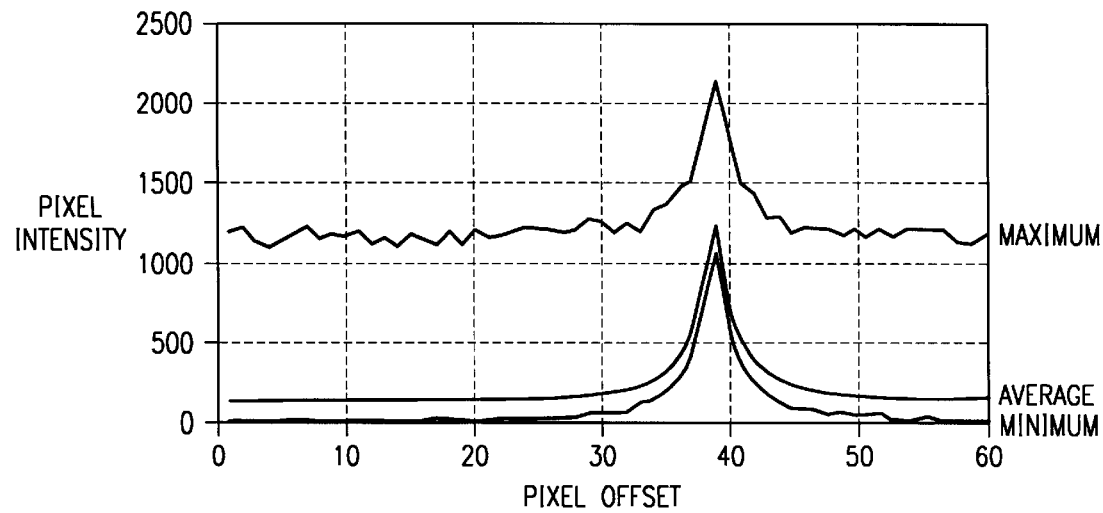
Figure 7D:
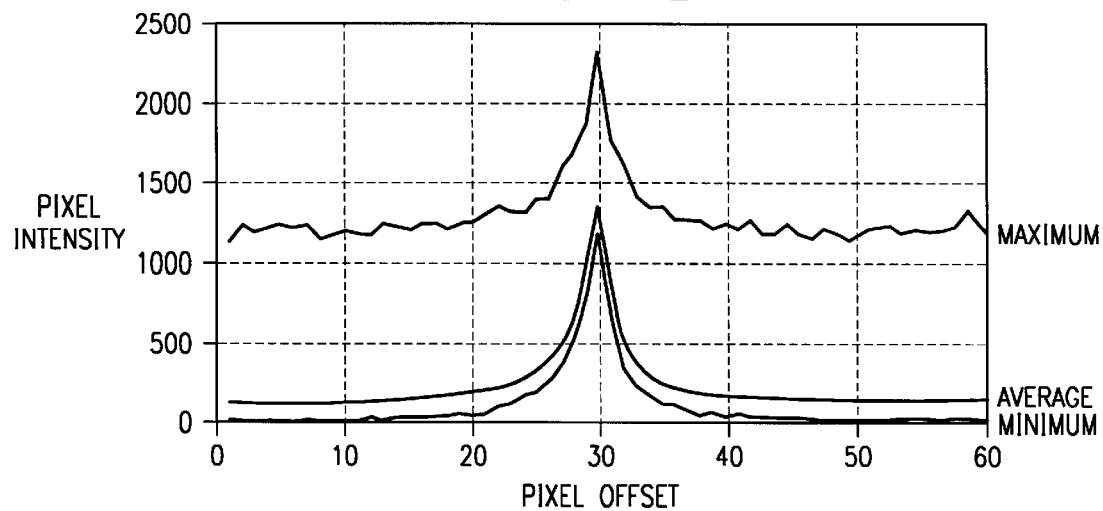

The charts of FIGS. 7A, 7B, 7C and 7D show several characteristics of the image that affect grid line detection. The charts show the minimum, maximum and average values for 60-pixel samples of grid lines. Because of differences in the pixel intensities at the center and the corners due to optical distortion, charts are shown for pixel intensities both at the corner and at the center. Moreover, for each of these two locations, charts are shown for vertical and horizontal sampling. The chart of FIG. 7A shows the relationship for vertical sampling at a corner, the chart of FIG. 7B shows the relationship for horizontal sampling at a corner, the chart of FIG. 7C shows the relationship for vertical sampling at the center and the chart of FIG. 7D shows the relationship for horizontal sampling at the center. As can be seen for all charts, the minimum and maximum curves are wavy, while the average curve is smooth. This illustrates local fluctuations between neighboring offsets but with an overall trend.

It should be noted that the dynamic range of samples is much higher at the center than at the corner. This is due to the fact that more light is captured at the center of the lens than at the edges. The charts show the relationship between the intensities at the different areas of the image. Because of the nature of CCD chips which are part of the CCD cameras used in the preferred embodiment, there is blurring of the grid lines. The blurring of the lines creates a penumbra.

The left side of the penumbra is assumed to begin where the minimum curve of a particular chart exceeds the lowest average value of the same chart. The right side of the penumbra ends where the minimum curve falls below the lowest average value. Table II shows the details of the penumbra for the charts of FIG. 7:

TABLE II

| Location | Sampling Direction | Grid Line Penumbra | | | |
|---|---|---|---|---|---|
| | | Lowest Average | Left | Pixel Offset Maximum | Right |
| Corner | Vertical | 102 | 25 | 35 | 37 |
| | Horizontal | 99 | 6 | 15 | 17 |

TABLE II-continued

| Location | Sampling Direction | Grid Line Penumbra | | | |
|---|---|---|---|---|---|
| | | Lowest Average | Left | Pixel Offset Maximum | Right |
| Center | Vertical | 122 | 34 | 39 | 44 |
| | Horizontal | 120 | 24 | 30 | 34 |

When determining the cell size, preferably the length increment should be at least the maximum number of pixels from an edge of the penumbra of the grid line to the pixel offset with the maximum intensity value.

For the example illustrated in the charts of FIG. 7, an increment of 10 is used. This is the maximum spread as shown in Table II for vertical sampling at the corner.

In order to avoid false selection of local maxima for a grid line, a threshold intensity value is used. In the preferred embodiment, maxima with pixel intensities greater than the threshold value are considered. The threshold value used for detecting the grid line is computed by analyzing the middle half of the middle row of the image. The minimum, maximum and average pixel intensities are first computed. The difference between the minimum value and the average is then computed.

$$difference1 = average - minimum$$

To protect against computing the threshold on a row which contains a horizontal grid line, the 'difference1' value is preferably less than or equal to 15% of difference2, where difference2=(maximum−minimum). If the difference1 value is greater than 15% of the difference2 value, then the row next to the center row is analyzed. If the difference1 value is less than or equal to 15% of the difference2 value, then the threshold value is the sum of the average and difference1 values. Thus, $$difference1 = average - minimum$$

$$difference2 = maximum - minimum$$

$$tolerance = 0.15 \times difference2$$

if(difference1>tolerance)
   try next line

When the difference between the average and minimum value is within tolerance, the threshold is calculated as follows:

$$threshold = average + difference1$$

All computations are preferably done using relative differences rather than absolute values. This ensures that the same results are obtained for images with a similar dynamic range regardless of the offset of the pixel intensities.

Because the optical plane of the imaging sensor and the calibration image may not be properly aligned with each other, therefore, in step 403 of the flowchart shown in FIG. 1, the determined cell size is corrected for alignment differences between the imaging sensor and the calibration image.

Figure 8:
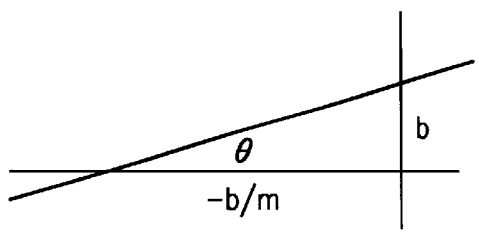
FIG. 8 shows the relationship between a grid line and the rotate and correction angle.

As shown in FIG. 8, the amount of rotation desired to correct for alignment differences is estimated by computing the arc tangent of the slope m in the following equation of a line:

$$y = m \cdot x + b \quad \text{(Equation 10)}$$

$$\tan(\Theta) = b/(-b/m) = -m$$

$$\Theta = -\arctan(m) \quad \text{(Equation 11)}$$

FIG. 8 shows the relationship between a grid line and the angle of rotation. In the preferred embodiment, it is desirable to calculate the length of the hypotenuse. However, if the optical plane of the imaging sensor and the calibration image are not properly aligned, then instead of the length of the hypotenuse, the length of the horizontal line shown in FIG. 8 would be determined. Therefore, in the preferred embodiment, the measured length is corrected for rotation.

Figure 9:
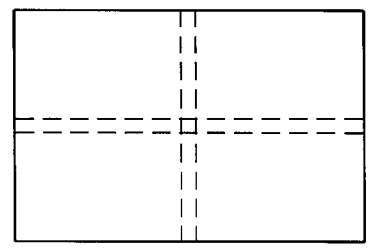
FIG. 9 shows the lines for estimating an angle of rotation.

As shown in FIG. 9, to estimate the angle, four lines in the image are preferably examined: the vertical lines to the left and right of the vertical center and the horizontal lines above and below the horizontal center. The lines in the center of the image are chosen as they are expected to have the least amount of barrel distortion and are expected to be more linear than lines further away from the center. The angle of rotation is the angle by which the hypotenuse is preferably rotated to provide the correct length.

The four lines shown in FIG. 9 are preferably fitted to equations using the method of least squares as described above. A measure of the goodness of fit for each of the lines is also computed and the line which fits the best is used to estimate the angle of rotation. Calculation of goodness of fit for a line is described next.

The goodness of fit for a line is computed by evaluating equation 10 for each of the x coordinates used to derive the equation and computing the difference between the measured y value and the evaluated y value (y'). This difference is squared in order to make any negative differences positive. All of the differences are added to provide the residual value, where $$residual = \sum_{i=o}^{n-1} (y_i' - y_i)^2 \quad \text{(Equation 11)}$$

The 'residual' value provides the amount by which the computed line deviates from the observed line. The sample data points used in the calculation of the residual value are usually integral. However, the value of the residual itself will most likely be fractional. The line for which the 'residual' is the smallest is considered to have the best fit and is preferably used to calculate the angle of rotation. As the captured image is usually wider, therefore, in most cases the horizontal line is the line with the best fit as there are more data points. However, this largely depends on the type of lens used.

The minimum angle that can be detected by this method occurs when there is a one pixel change across the maximum dimension of the image.

$$\Theta_{MIN} = \arctan(1/DIM_{MAX}) \quad \text{(Equation 12)}$$

For an image with dimensions of 1536×1024:

$$\Theta_{MIN} = \arctan(1/1536) = 0.000651 \text{ radians} = 0.0363 \text{ degrees}$$

Figure 10:
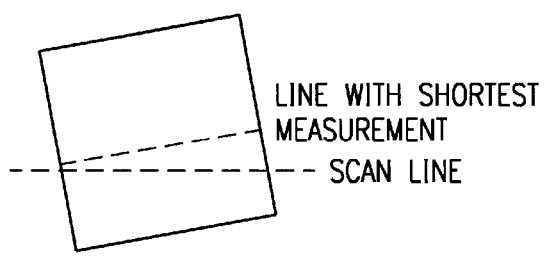
FIG. 10 shows a cell rotated due to non-alignment of an imaging sensor and an imaging screen.
Figure 11:
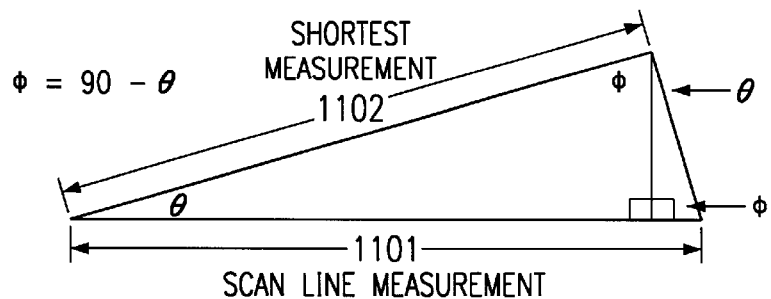
FIG. 11 shows a diagram for scan line measurement.

When the cell size is measured, the distance between grid lines is computed using a true horizontal or vertical scan line. If the image is rotated as shown in FIG. 10, the measured line will be slightly longer than if the image was not rotated.

The relationship between the scan line measurement 1101 and the shortest measurement 1102 is derived from the law of sines:

$$\frac{scanline}{\sin(90°)} = \frac{shortest}{\sin(90° - \Theta)} \quad \text{(Equation 13)}$$

$$\frac{scanline}{1} = \frac{shortest}{(\sin(90°) \cdot \cos(\Theta)) - (\cos(90°) \cdot \sin(\Theta))}$$

$$scanline = \frac{shortest}{\cos(\Theta)}$$

From equation 13, the effect of a rotation of 1 degree on a cell size measurement of a 60-pixel cell can be computed as follows:

$$scanline = \frac{60}{\cos(1°)} = \frac{60}{0.99985} = 60.01$$

Thus, for a 1 degree rotational correction, there would be a difference in measurement of 0.01 pixels. If the preferred accuracy of measurement is +/−0.05 pixels for a 60 pixel cell size, then:

$$60 - 60 \cdot \cos(\Theta) = 0.05$$

$$\cos(\Theta) = \frac{60 - 0.05}{60}$$

$$\Theta = \arccos(0.99917) = 2.33°$$

For angles greater than 2.33 degrees, the image is preferably corrected for rotation before estimating the cell size. However, if the rotation angle is less than 2.33 degrees, the effect of the rotation is not substantial on the estimated or determined cell size. Once the angle of rotation is determined, the image is corrected for rotation by a suitable method known to one of ordinary skill in the art.

Once the cell size of an image is known and after rotational correction, if any, in step 404 of the flowchart of FIG. 1, the grid points of the image are estimated. A grid point is the point of intersection between a horizontal grid line and a vertical grid line. The image is scanned in 'cell-size' blocks looking for first a horizontal grid line segment and then a vertical grid line segment. If both segments are detected, then in the preferred embodiment, each line is fitted to a polynomial and the point of intersection is computed. Grid line segments near the center of the image are usually linear while grid line segments near the edges are cubic.

Each grid line segment is approximated by first fitting to a cubic, then a quadratic and finally a linear polynomial. A measure of the goodness of fit is computed and the polynomial with the best fit i.e. the least residue is preferably used in computing the intersection point.

Cubic:

$$a + bx + cx^2 + dx^3 = 0$$

Quadratic:

$$a + bx + cx^2 + 0x^3 = 0 \quad d = 0$$

Linear:

$$a + bx + 0x^2 + 0x^3 = 0 \quad c = 0, d = 0$$

The measurement of the goodness of fit has been discussed above. The point of intersection between two cubic polynomials may be determined as discussed in detail below. The details of fitting a grid line segment to a linear polynomial have been discussed above with regard to the method of least squares. The preferred process for fitting a quadratic polynomial is discussed next.

The equation of a quadratic polynomial may be written as:

$$y = a + b \cdot x + c \cdot x^2 \quad \text{(Equation 14)}$$

To solve an over-determined system with n points, where n is greater than 3, solve the system of linear equations of the form:

$$Au = v \quad \text{(Equation 15)}$$

where A is a 3×n matrix, u is a vector of 3 unknowns (a, b and c), and v is a vector of n points.

$$\begin{bmatrix} 1 & x_0 & x_0^2 \\ 1 & x_1 & x_1^2 \\ \vdots & \vdots & \vdots \\ 1 & x_{n-1} & x_{n-1}^2 \end{bmatrix} \times \begin{bmatrix} a \\ b \\ c \end{bmatrix} = \begin{bmatrix} y_0 \\ y_1 \\ \vdots \\ y_{n-1} \end{bmatrix}$$

Using the method of least squares, multiply both sides of equation 15 by the transpose of A, i.e. $A^T$, where:

$$A^T = \begin{bmatrix} 1 & 1 & \dots & 1 \\ x_0 & x_1 & \dots & x_{n-1} \\ x_0^2 & x_1^2 & \dots & x_{n-1}^2 \end{bmatrix}$$

$$A^T A u = A^T v \quad \text{(Equation 16)}$$

Define A' as $A^T A$, v' as $A^T v$:

$$A'u = v', \text{ where} \quad \text{(Equation 17)}$$

$$A' = \begin{bmatrix} \sum_{i=0}^{n-1} 1 & \sum_{i=0}^{n-1} x_i & \sum_{i=0}^{n-1} x_i^2 \\ \sum_{i=0}^{n-1} x_i & \sum_{i=0}^{n-1} x_i^2 & \sum_{i=0}^{n-1} x_i^3 \\ \sum_{i=0}^{n-1} x_i^2 & \sum_{i=0}^{n-1} x_i^3 & \sum_{i=0}^{n-1} x_i^4 \end{bmatrix}, u = \begin{bmatrix} a \\ b \\ c \end{bmatrix}, \text{ and } v' = \begin{bmatrix} \sum_{i=0}^{n-1} y_i \\ \sum_{i=0}^{n-1} x_i \cdot y_i \\ \sum_{i=0}^{n-1} x_i^2 \cdot y_i \end{bmatrix}$$

Note that matrix A' is symmetric, that is, for each element not on the diagonal:

$$A'_{ij} = A'_{ji}$$

Because matrix A' is symmetric, Cholesky's factorization may be used to solve this system. By this method, first find two matrices L and U such that A'=LU, where $L=U^T$. To solve the system A'u=v', substitute LU for A' in equation 17:

$$LUu = v' \quad \text{(Equation 18)}$$

Multiplying both sides by $L^{-1}$ $$Uu = w \quad \text{(Equation 19)}$$

where $$w = L^{-1} v' \quad \text{(Equation 20)}$$

Multiplying equation 20 by L:

$$Lw = v' \quad \text{(Equation 21)}$$

The steps in solving the system are as follows: Find the Cholesky factorization of A'=LU:

$$L = \begin{bmatrix} r_{00} & 0 & 0 \\ r_{01} & r_{11} & 0 \\ r_{02} & r_{12} & r_{22} \end{bmatrix} \quad U = \begin{bmatrix} r_{00} & r_{01} & r_{02} \\ 0 & r_{11} & r_{12} \\ 0 & 0 & r_{22} \end{bmatrix}$$

Multiply L and U to get the following equations:

$$a_{00} = r_{00} \cdot r_{00} \quad r_{00} = \sqrt{a_{00}} \quad (0)$$

$$a_{01} = r_{00} \cdot r_{01} \quad r_{01} = a_{01}/r_{00} = a_{01}/\sqrt{a_{00}} \quad (1)$$

$$a_{02} = r_{00} \cdot r_{02} \quad r_{02} = a_{02}/r_{00} = a_{02}/\sqrt{a_{00}} \quad (2)$$

$$a_{10} = r_{01} \cdot r_{00} = a_{01} \text{ (same as (1))} \quad (3)$$

$$a_{11} = r_{01} \cdot r_{01} + r_{11} \cdot r_{11} \quad r_{11} = \sqrt{a_{11} - r_{01}^2} \quad (4)$$

$$a_{12} = r_{01} \cdot r_{02} + r_{11} \cdot r_{12} \quad r_{12} = (a_{12} - (r_{01} \cdot r_{02}))/r_{11} \quad (5)$$

$$a_{20} = r_{02} \cdot r_{00} = a_{02} \text{ (same as (2))} \quad (6)$$

$$a_{21} = r_{02} \cdot r_{01} + r_{12} \cdot r_{11} = a_{12} \text{ (same as (5))} \quad (7)$$

$$a_{22} = r_{02} \cdot r_{02} + r_{12} \cdot r_{12} + r_{22} \cdot r_{22} \quad r_{22} = \sqrt{a_{22} - r_{02}^2 - r_{12}^2} \quad (8)$$

Once the decomposition of A' has been computed, find the vector w such that Lw=v' (Equation 21):

$$L = \begin{bmatrix} r_{00} & 0 & 0 \\ r_{01} & r_{11} & 0 \\ r_{02} & r_{12} & r_{22} \end{bmatrix} w = \begin{bmatrix} w_0 \\ w_1 \\ w_2 \end{bmatrix} v' = \begin{bmatrix} \sum_{i=0}^{n-1} y_i \\ \sum_{i=0}^{n-1} x_i \cdot y_i \\ \sum_{i=0}^{n-1} x_i^2 \cdot y_i \end{bmatrix} = \begin{bmatrix} v_0 \\ v_1 \\ v_2 \end{bmatrix}$$

Multiply L and w to get the following equations:

$$r_{00} \cdot w_0 = v_0 \quad w_0 = v_0/r_{00} \quad (0)$$

$$r_{01} \cdot w_0 + r_{11} \cdot w_1 = v_1 \quad w_1 = (v_1 - (r_{01} \cdot w_0))/r_{11} \quad (1)$$

$$r_{02} \cdot w_0 + r_{12} \cdot w_1 + r_{22} \cdot w_2 = v_2 \quad w_2 = (v_2 - (r_{02} \cdot w_0) - (r_{12} \cdot w_1))/r_{22} \quad (2)$$

Next, solve for vector u in the equation Uu=w (Equation 19):

$$U = \begin{bmatrix} r_{00} & r_{01} & r_{02} \\ 0 & r_{11} & r_{12} \\ 0 & 0 & r_{22} \end{bmatrix} u = \begin{bmatrix} a \\ b \\ c \end{bmatrix} w = \begin{bmatrix} w_0 \\ w_1 \\ w_2 \end{bmatrix}$$

Multiply U and u to get the following equations:

$$r_{22} \cdot c = w_2 \quad c = w_2/r_{22} \quad (0)$$

$$r_{11} \cdot b + r_{12} \cdot c = w_1 \quad b = (w_1 - (r_{12} \cdot c))/r_{11} \quad (1)$$

$$r_{00} \cdot a + r_{01} \cdot b + r_{02} \cdot c = w_0 \quad a = (w_0 - (r_{01} \cdot b) - (r_{02} \cdot c))/r_{00} \quad (2)$$

This completes the computation of a, b and c of equation 14. The goodness of fit is preferably computed in the same manner as already discussed above with regard to a line:

$$y'_i = a + b \cdot x_i + c \cdot x_i^2$$

$$\text{residual} = \sum_{i=0}^{n-1}(y'_i - y_i)^2$$

The process for fitting a cubic polynomial is discussed next. The equation of a cubic polynomial may be written as:

$$y = a + b \cdot x + c \cdot x^2 + d \cdot x^3 \quad \text{(Equation 22)}$$

To solve an over-determined system with n points, where n is greater than 4, solve the system of linear equations of the form:

$$Au = v \quad \text{(Equation 23)}$$

where A is 4×n matrix, u is a vector of 4 unknowns (a, b, c and d), and v is a vector of n points.

$$\begin{bmatrix} 1 & x_0 & x_0^2 & x_0^3 \\ 1 & x_1 & x_1^2 & x_1^3 \\ \vdots & \vdots & \vdots & \vdots \\ 1 & x_{n-1} & x_{n-1}^2 & x_{n-1}^3 \end{bmatrix} \times \begin{bmatrix} a \\ b \\ c \\ d \end{bmatrix} = \begin{bmatrix} y_0 \\ y_1 \\ \vdots \\ y_{n-1} \end{bmatrix}$$

Using the method of least squares, multiply both sides of equation 23 by the transpose of A i.e. $A^T$, where $$A^T = \begin{bmatrix} 1 & 1 & \cdots & 1 \\ X_0 & X_1 & \cdots & X_{n-1} \\ X_0^2 & X_1^2 & \cdots & X_{n-1}^2 \\ X_0^3 & X_1^3 & \cdots & X_{n-1}^3 \end{bmatrix}$$

$$A^T A u = A^T v \quad \text{(Equation 24)}$$

Define A' as $A^T A$, v' as $A^T v$:

$$A'u = v', \text{ where} \quad \text{(Equation 25)}$$

$$A' = \begin{bmatrix} \sum_{i=1}^{n-1} 1 & \sum_{i=0}^{n-1} x_i & \sum_{i=0}^{n-1} x_i^2 & \sum_{i=0}^{n-1} x_i^3 \\ \sum_{i=0}^{n-1} x_i & \sum_{i=0}^{n-1} x_i^2 & \sum_{i=0}^{n-1} x_i^3 & \sum_{i=0}^{n-1} x_i^4 \\ \sum_{i=0}^{n-1} x_i^2 & \sum_{i=0}^{n-1} x_i^3 & \sum_{i=0}^{n-1} x_i^4 & \sum_{i=0}^{n-1} x_i^5 \\ \sum_{i=0}^{n-1} x_i^3 & \sum_{i=0}^{n-1} x_i^4 & \sum_{i=0}^{n-1} x_i^5 & \sum_{i=0}^{n-1} x_i^6 \end{bmatrix}, u = \begin{bmatrix} a \\ b \\ c \\ d \end{bmatrix}, \text{ and } v' = \begin{bmatrix} \sum_{i=0}^{n-1} y_i \\ \sum_{ii=0}^{n-1} x_i \cdot y_i \\ \sum_{ii=0}^{n-1} x_i^2 \cdot y_i \\ \sum_{ii=0}^{n-1} x_i^3 \cdot y_i \end{bmatrix}$$

Because matrix A' is symmetric, Cholesky's factorization may be used to solve this system. By this method, first find two matrices L and U such that A'=LU, where $L = U^T$. To solve the system A'u=v', substitute LU for A':

$$LUu = v' \quad \text{(Equation 26)}$$

Multiplying both sides by $L^{-1}$ $$Uu = w \quad \text{(Equation 27)}$$

where $$w = L^{-1} v' \quad \text{(Equation 28)}$$

Multiplying equation 28 by L:

$$Lw = v' \quad \text{(Equation 29)}$$

The steps in solving the system are as follows: Find the Cholesky factorization of A'=LU:

$$L = \begin{bmatrix} r_{00} & 0 & 0 & 0 \\ r_{01} & r_{11} & 0 & 0 \\ r_{02} & r_{12} & r_{22} & 0 \\ r_{03} & r_{13} & r_{23} & r_{33} \end{bmatrix} \quad U = \begin{bmatrix} r_{00} & r_{01} & r_{02} & r_{03} \\ 0 & r_{11} & r_{12} & r_{13} \\ 0 & 0 & r_{22} & r_{23} \\ 0 & 0 & 0 & r_{33} \end{bmatrix}$$

Multiply L and U to get the following equations:

$a_{00} = r_{00} \cdot r_{00} \quad r_{00} = \sqrt{a_{00}}$ (0)

$a_{01} = r_{00} \cdot r_{01} \quad r_{01} = a_{01}/r_{00} = a_{01}/\sqrt{a_{00}}$ (1)

$a_{02} = r_{00} \cdot r_{02} \quad r_{02} = a_{02}/r_{00} = a_{02}/a_{00}$ (2)

$a_{03} = r_{00} \cdot r_{03} \quad r_{03} = a_{03}/r_{00} = a_{03}/\sqrt{a_{00}}$ (3)

$a_{10} = r_{01} \cdot r_{00} = a_{01}$ (same as (1)) (4)

$a_{11} = r_{01} \cdot r_{01} + r_{11} \cdot r_{11} \quad r_{11} = \sqrt{a_{11} - r_{01}^2}$ (5)

$a_{12} = r_{01} \cdot r_{02} + r_{11} \cdot r_{12} \quad r_{12} = (a_{12} - (r_{01} \cdot r_{02}))/r_{11}$ (6)

$a_{13} = r_{01} \cdot r_{03} + r_{11} \cdot r_{13} \quad r_{13} = (a_{13} - (r_{01} \cdot r_{03}))/r_{11}$ (7)

$a_{20} = r_{02} \cdot r_{00} = a_{02}$ (same as (2)) (8)

$a_{21} = r_{02} \cdot r_{01} + r_{12} \cdot r_{11} = a_{12}$ (same as (6)) (9)

$a_{22} = r_{02} \cdot r_{02} + r_{12} \cdot r_{12} + r_{22} \cdot r_{22} \quad r_{22} = \sqrt{a_{22} - r_{02}^2 - r_{12}^2}$ (10)

$a_{23} = r_{02} \cdot r_{03} + r_{12} \cdot r_{13} + r_{22} \cdot r_{23} \quad r_{23} = (a_{23} - (r_{02} \cdot r_{03}) - (r_{12} \cdot r_{13}))/r_{22}$ (11)

$a_{30} = r_{03} \cdot r_{00} = a_{03}$ (same as (3)) (12)

$a_{31} = r_{03} \cdot r_{01} + r_{13} \cdot r_{11} = a_{13}$ (same as (7)) (13)

$a_{32} = r_{03} \cdot r_{02} + r_{13} \cdot r_{12} + r_{23} \cdot r_{22} = a_{23}$ (same as (11)) (14)

$a_{33} = r_{03} \cdot r_{03} + r_{13} \cdot r_{13} + r_{23} \cdot r_{23} + r_{33} \cdot r_{33} \quad r_{33} = \sqrt{a_{33} - r_{03}^2 - r_{13}^2 - r_{23}^2}$ (15)

Once the decomposition of A' has been computed, find the vector w such that Lw=v' (Equation 29):

$$L = \begin{bmatrix} r_{00} & 0 & 0 & 0 \\ r_{01} & r_{11} & 0 & 0 \\ r_{02} & r_{12} & r_{22} & 0 \\ r_{03} & r_{13} & r_{23} & r_{33} \end{bmatrix} \quad w = \begin{bmatrix} w_0 \\ w_1 \\ w_2 \\ w_3 \end{bmatrix} \quad v' = \begin{bmatrix} \sum_{i=0}^{n-1} y_i \\ \sum_{i=0}^{n-1} x_i \cdot y_i \\ \sum_{i=0}^{n-1} x_i^2 \cdot y_i \\ \sum_{i=0}^{n-1} x_i^3 \cdot y_i \end{bmatrix} = \begin{bmatrix} v_0 \\ v_1 \\ v_2 \\ v_3 \end{bmatrix}$$

Multiply L and w to get the following equations:

$r_{00} \cdot w_0 = v_0 \quad w_0 = v_0/r_{00}$ (0)

$r_{01} \cdot w_0 + r_{11} \cdot w_1 = v_1 \quad w_1 = (v_1 - (r_{01} \cdot w_1))/r_{11}$ (1)

$$r_{02} \cdot w_0 + r_{12} \cdot w_1 + r_{22} \cdot w_2 = v_2 \quad w_2 = (v_2 - (r_{02} \cdot w_0) - (r_{12} \cdot w_1))/r_{22} \quad (2)$$

$$r_{03} \cdot w_0 + r_{13} \cdot w_1 + r_{23} \cdot w_2 + r_{33} \cdot w_3 = v_3 \quad w_3 = (v_3 - (r_{03} \cdot w_0) - (r_{13} \cdot w_1) - (r_{23} \cdot w_2))/r_{33} \quad (3)$$

Next, solve for vector u in the equation Uu=w (Equation 27):

$$U = \begin{bmatrix} r_{00} & r_{01} & r_{02} & r_{03} \\ 0 & r_{11} & r_{12} & r_{13} \\ 0 & 0 & r_{22} & r_{23} \\ 0 & 0 & 0 & r_{33} \end{bmatrix} \quad u = \begin{bmatrix} a \\ b \\ c \\ d \end{bmatrix} \quad w = \begin{bmatrix} w_0 \\ w_1 \\ w_2 \\ w_3 \end{bmatrix}$$

Multiply U and u to get the following equations:

$$r_{33} \cdot d = w_3 \quad d = w_3/r_{33} \quad (0)$$

$$r_{22} \cdot c + r_{23} \cdot d = w_2 \quad c = (w_2 - (r_{23} \cdot d))/r_{22} \quad (1)$$

$$r_{11} \cdot b + r_{12} \cdot c + r_{13} \cdot d = w_1 \quad b = (w_1 - (r_{12} \cdot c) - (r_{13} \cdot d))/r_{11} \quad (2)$$

$$r_{00} \cdot a + r_{01} \cdot b + r_{02} \cdot c + r_{03} \cdot d = w_0 \quad a = (w_0 - (r_{01} \cdot b) - (r_{02} \cdot c) - (r_{03} \cdot d))/r_{00} \quad (3)$$

This completes the computation of a, b, c and d of equation 22. The goodness of fit is preferably computed in the same manner as already discussed above with regard to a line:

$$y'_i = a + b \cdot x_i + c \cdot x_i^2 + d \cdot x_i^2$$

$$residual = \sum_{i=0}^{n-1} (y'_i - y_i)^2$$

Typically the cubic polynomial provides the best goodness of fit. Therefore, the determination of the point of intersection of the cubic polynomials is discussed next. This method is preferably used to determine intersection points between vertical and horizontal lines.

Determining the point of intersection between two cubic polynomials is a non-linear system with two equations and two unknowns. A point (x, y) is preferably determined such that it satisfies the following equation for a vertical line of the grid:

$$x = v_0 + v_1 \cdot y + v_2 \cdot y^2 + v_3 \cdot y^3 \quad \text{(Equation 30)}$$

and the following equation for a horizontal line of the grid:

$$y = h_0 + h_1 \cdot x + h_2 \cdot x^2 + h_3 \cdot x^3 \quad \text{(Equation 31)}$$

When looking for a grid point, there is an additional constraint that the solution to the system fall within the boundaries of the cell-sized block from which the two equations were derived. These boundaries are said to bracket the solution.

In order to solve this system, an iterative method is used in the preferred embodiment, i.e., an approximation to the solution is made and modified in successive iterations such that the sequence of approximations converges to a solution. Thus, an arbitrary y value is selected as the intersection point. In the preferred embodiment, this selected y value is half way between the two extreme y values for a given grid line.

In the preferred embodiment, the boundary bracket for Y [$Y_{start}$, $Y_{end}$] is divided in half such that:

$$y_{half} = y_{start} + \frac{y_{end} - y_{start}}{2}$$

and equation 30 is evaluated at this half-way point:

$$x' = v_0 + v_1 \cdot y_{half} + v_2 \cdot y_{half}^2 + v_3 \cdot y_{half}^3$$

Equation 31 is then evaluated using the derived x value (x'):

$$y' = h_0 + h_1 \cdot x' + h_2 \cdot x'^2 + h_3 \cdot x'^3$$

The difference between the half-way point and the derived y value (Y') is then computed:

$$\text{difference} = y' - y_{half}$$

Figure 12:
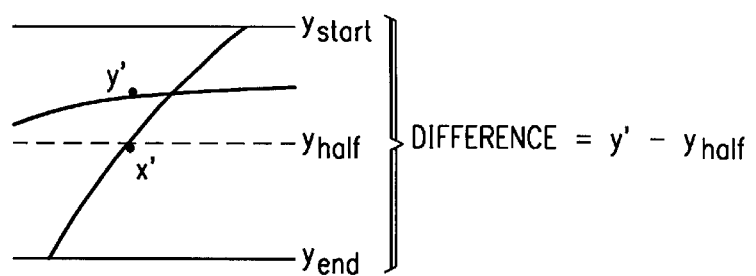
FIG. 12 shows an iterative method for determining intersection points between the grid lines.

If the difference is positive, the solution lies in the higher half of the bracket and the start value of the bracket is replaced with the half-way y value. The method as described above is shown in FIG. 12 in which the value of y increases upwards and the value of x increases to the right. If the difference is negative, the solution lies in the lower half of the bracket and the end value of the bracket is replaced with the half-way y value. The computation is then repeated with the new bracket.

If (difference>0)

$$y_{start} = y_{half}$$

else $$y_{end} = y_{half}$$

As with most iterative methods, tests are performed to determine (1) when an approximation is sufficiently close to the solution and (2) when to give up if there is no convergence. Convergence is considered to be achieved when the absolute value of the difference is less than a predetermined value, say $2^{-10}$. The value $2^{-10}$, is considered to be the tolerance of the solution. The maximum number of iterations required to achieve this accuracy is the smallest integer n satisfying the equation:

$$\text{original bracket size} \leq 2^{n-10}$$

For a bracket size of 60 pixels: $60 \leq 2^{n-10} \Rightarrow n=16$. Therefore, a maximum of 16 iterations may be required to achieve the desired convergence.

Once the grid points have been computed in step 404 of the flowchart of FIG. 1, in step 405 the determined grid points are preferably fitted to polynomials providing the best fit as determined in step 404. The polynomials providing the best fit are usually cubic polynomials. Therefore, in most cases the grid points are fitted to cubic polynomials to mathematically describe the grid lines. The method for fitting grid points to cubic polynomials is the same as that described above with reference to step 404.

Figure 13:
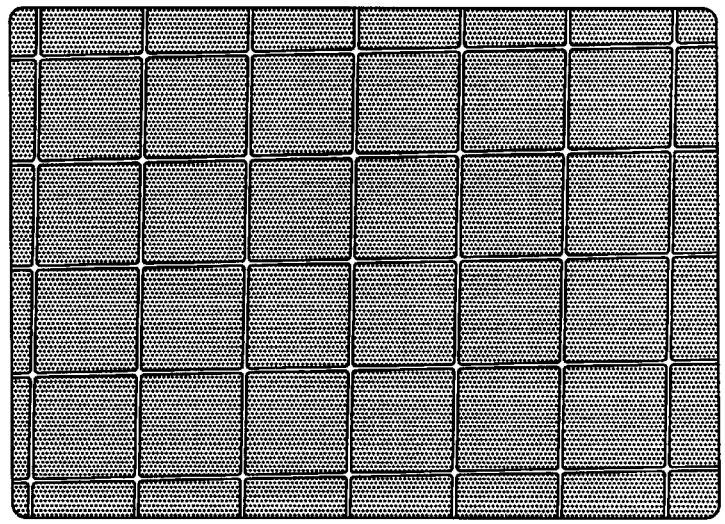
FIG. 13 shows a portion of a grid with the cubic polynomials fitted to grid points.

FIG. 13 shows a portion of the grid image with the cubic polynomials fitted to the grid points, where a grid in black is shown positioned over the original grid in white after the cubic polynomial fitting. As can be seen the black grid corresponds substantially with the original grid in white.

In order to avoid computing the barrel correction on a horizontal or vertical grid line which only partially covers the image, in the preferred embodiment all the grid points are written to a file, for example a text file, which may be stored on a processor based system, such as a personal computer. These grid points may be modified by hand when necessary in order to add or remove points. The barrel correction can then be computed using the modified text file.

After cubic polynomials have been fitted to the grid points in step 405 of the flowchart of FIG. 1, in step 406, stretch factors are calculated so that after the pixels of the image are stretched by the determined stretch factors, each cell in the image is of the same size. Computations are performed to determine the amount by which to stretch each pixel to correct for the barrel distortion. In the preferred embodiment, computations are done in two steps: first the image is stretched in the x direction, then it is stretched in the y direction. However, in alternative embodiments, the image may be stretched in the y direction first and then stretched in the x direction.

Figure 14:
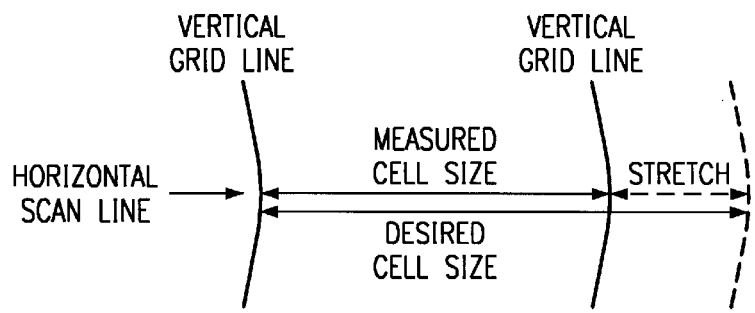
FIG. 14 shows the computation of the stretch factors in the x direction.

To stretch the image in the x direction, the image is processed in horizontal scan lines. To stretch the image in the y direction, the image is processed in vertical scan lines. For each horizontal scan line, the intersection points of two adjacent vertical grid lines with the horizontal scan lines is determined. The distance between the cubic polynomials for the two vertical grid lines is then measured. The amount of stretch is the difference between the measured distance and the desired distance as shown in FIG. 14. The desired distance is preferably the cell size parameter determined in step 402. The amount of stretch is then distributed linearly amongst the pixels within the cell. The factor by which each pixel is stretched is determined by dividing the desired cell size by the measured cell size.

Computations preferably start at the vertical center of the image and proceed outwards towards the edges. First, the stretch is computed from the vertical center towards the right, then from the vertical center towards the left. The smallest amount of stretch is expected at the center of the image. The amount of stretch is expected to increase from the center outwards.

In order to stretch a scan line to the right, start with the pixel immediately to the right of the vertical center. Assuming that the left edge of the pixel aligns exactly with the vertical center, the left edge of each successive pixel aligns with the right edge of the previously stretched pixel thereby creating a cascading stretching effect.

Consider the following example in which the image size is 1536×1024 pixels. Table III shows the cubic polynomials which estimate the vertical grid lines according to the formula:

$$x_i = a + b \cdot y_i + c \cdot y_i^2 + d \cdot y_i^3$$

where i ranges from 0 to maximum number of cells (i.e., dimension of the image/cell size).

Since the width of the image is 1536, assuming a cell size of 60 pixels, the number of vertical grid lines given by the integer value of (1536/60) which is 25.

TABLE III

Cubic polynomials for vertical grid lines

| No. | a | b | c | d |
|---|---|---|---|---|
| 1 | 37.6772 | −0.0356844 | $3.34934 \times 10^{-5}$ | $4.53285 \times 10^{-11}$ |
| 2 | 93.0732 | −0.0349899 | $3.38369 \times 10^{-5}$ | $-1.35510 \times 10^{-9}$ |
| 3 | 148.353 | −0.0317410 | $2.97655 \times 10^{-5}$ | $6.37902 \times 10^{-12}$ |
| 4 | 204.320 | −0.0284958 | $2.63624 \times 10^{-5}$ | $2.55376 \times 10^{-10}$ |
| 5 | 260.742 | −0.0246465 | $2.04156 \times 10^{-5}$ | $2.75085 \times 10^{-9}$ |
| 6 | 317.290 | −0.0203272 | $1.78860 \times 10^{-5}$ | $1.33057 \times 10^{-9}$ |
| 7 | 375.369 | −0.0215242 | $2.16249 \times 10^{-5}$ | $-1.57296 \times 10^{-9}$ |
| 8 | 433.141 | −0.0187299 | $1.92875 \times 10^{-5}$ | $-1.80680 \times 10^{-9}$ |
| 9 | 491.064 | −0.0133218 | $1.13366 \times 10^{-5}$ | $1.38994 \times 10^{-9}$ |
| 10 | 549.621 | −0.0107503 | $1.06017 \times 10^{-5}$ | $-4.87301 \times 10^{-10}$ |
| 11 | 608.794 | −0.0107931 | $1.11674 \times 10^{-5}$ | $-1.14760 \times 10^{-9}$ |
| 12 | 667.526 | −0.0062669 | $6.14412 \times 10^{-5}$ | $-3.18487 \times 10^{-10}$ |
| 13 | 726.007 | 0.0002593 | $-1.08134 \times 10^{-5}$ | $9.43056 \times 10^{-10}$ |
| 14 | 785.997 | 0.0000137 | $-1.69058 \times 10^{-5}$ | $-1.61022 \times 10^{-11}$ |
| 15 | 844.400 | 0.0066980 | $-7.21613 \times 10^{-5}$ | $9.81208 \times 10^{-10}$ |
| 16 | 904.323 | 0.0048286 | $-3.87572 \times 10^{-5}$ | $-8.15126 \times 10^{-10}$ |
| 17 | 963.538 | 0.0058951 | $-5.41281 \times 10^{-5}$ | $-1.15679 \times 10^{-10}$ |
| 18 | 1022.033 | 0.0117329 | $-1.22301 \times 10^{-5}$ | $1.31497 \times 10^{-9}$ |
| 19 | 1080.808 | 0.0127555 | $-1.15757 \times 10^{-5}$ | $-5.79436 \times 10^{-10}$ |
| 20 | 1139.176 | 0.0158321 | $-1.59939 \times 10^{-5}$ | $1.14179 \times 10^{-9}$ |
| 21 | 1196.655 | 0.0222358 | $-2.38090 \times 10^{-5}$ | $3.15143 \times 10^{-9}$ |
| 22 | 1254.499 | 0.0229174 | $-2.29452 \times 10^{-5}$ | $1.59373 \times 10^{-9}$ |
| 23 | 1311.666 | 0.0254730 | $-2.50169 \times 10^{-5}$ | $1.123041 \times 10^{-9}$ |
| 24 | 1368.103 | 0.0300314 | $-2.88221 \times 10^{-5}$ | $4.64905 \times 10^{-10}$ |
| 25 | 1424.120 | 0.0318965 | $-2.89881 \times 10^{-5}$ | $-7.29609 \times 10^{-10}$ |

Note that for a y-offset of zero ($y_i=0$), the value of $x_i$ for each polynomial is equal to the value in column with heading "a" of Table III. A y-offset of zero is used in the following example for simplicity.

To stretch pixels from the vertical center to the right, first determine the vertical center. The vertical center is given by dividing the width of the image by 2. In the above example, the vertical center is 1536/2=768.

The stretch factor at the center of the image is determined from the two polynomials to on either side of the center. Since in the above example the vertical center is at 768, the two polynomials on either side of the center would be numbers 13 and 14 in Table III.

Therefore, the measured distance would be given by delta=$x_{14} - x_{13}$=785.997−726.007=59.99 stretch factor=desired cell size/measured cell size

Therefore, if the desired cell size is 60.00 pixels, then stretch factor=60.00/59.99=1.000167

Each pixel between 768 and 785 is stretched by a factor of 1.000167. The left side of the first pixel (768) aligns exactly with offset 768.0 while the right side aligns with the offset of (768+1.000167=) 769.000167. For the second pixel (769), the left side aligns with 769.000167 and the right side with (769.000167+1.000167=) 770.000334. For the last pixel in the cell (785), the left side aligns with (768+(17× 1.000167)=) 785.002839 and the right side with (768+(18× 1.000167)=) 786.0003006.

Table IV shows the rightmost offsets for all of the cells to the right of the vertical center for a y-offset of zero.

TABLE IV

Right stretch factors and offsets

| Grid Lines | Measured | Factor | Pixels | Rightmost |
|---|---|---|---|---|
| 785.997–726.007 | 59.990 | 1.000167 | 768 to 785 (18) | 786.003 |
| 844.400–785.997 | 58.403 | 1.027344 | 786 to 844 (59) | 846.616 |
| 904.323–844.400 | 59.923 | 1.001285 | 845 to 904 (60) | 906.693 |
| 963.538–904.323 | 59.215 | 1.013257 | 905 to 963 (59) | 966.475 |
| 1022.033–963.538 | 58.495 | 1.025729 | 964 to 1022 (59) | 1026.993 |
| 1080.808–1022.033 | 58.775 | 1.020842 | 1023 to 1080 (58) | 1086.202 |
| 1139.176–1080.808 | 58.368 | 1.027961 | 1081 to 1139 (59) | 1146.852 |
| 1196.655–1139.176 | 57.479 | 1.043859 | 1140 to 1196 (57) | 1206.352 |
| 1254.499–1196.655 | 57.844 | 1.037273 | 1197 to 1254 (58) | 1266.514 |
| 1311.666–1254.499 | 57.167 | 1.049557 | 1255 to 1311 (57) | 1326.339 |
| 1368.103–1311.666 | 56.437 | 1.063132 | 1312 to 1368 (57) | 1386.938 |
| 1424.120–1368.103 | 56.017 | 1.071103 | 1369 to 1424 (56) | 1446.920 |

It can be seen from Table IV that there is a maximum shift of 1446.920−1424.000=22.920 pixels to the right. Note that pixels beyond 1424 cannot be stretched since there are no grid lines from which to estimate stretch factors. The pixels from 1425 to 1536 are left exactly as they were. This can be done by using a stretch factor of 1.0.

When the final pixel dimension is the same as the original, the pixels at the outermost edges may be wholly or partially lost. When stitching multiple images, there must be sufficient overlap of field of view such that loss of edge pixels is not an issue. The amount of overlap required depends upon many factors. For the purposes of barrel correction, it depends upon the image size and the amount of barrel distortion.

Table V shows the leftmost offsets for stretching from the vertical center to the left. In this case, the rightmost edge of the first pixel (767) aligns with the exact vertical center of 768.000. The leftmost edge of the first pixel aligns with 768.000−1.000167=766.999833. For the last pixel in the cell (727), the leftmost edge aligns with 768.000−(41× 1.000167)=726.993153.

TABLE V

Left stretch factors and offsets

| Grid Lines | Delta | Factor | Pixels | Rightmost |
| --- | --- | --- | --- | --- |
| 785.997–726.007 | 59.990 | 1.000167 | 767 to 727 (41) | 726.993 |
| 726.007–667.526 | 58.481 | 1.025974 | 726 to 668 (59) | 666.461 |
| 667.526–608.794 | 58.732 | 1.021590 | 667 to 609 (59) | 606.187 |
| 608.794–549.621 | 59.173 | 1.013976 | 608 to 550 (59) | 546.362 |
| 549.621–491.064 | 58.557 | 1.024643 | 549 to 492 (58) | 486.933 |
| 491.064–433.141 | 57.923 | 1.035858 | 491 to 434 (58) | 426.853 |
| 433.141–375.369 | 57.772 | 1.038565 | 433 to 376 (58) | 366.313 |
| 375.369–317.290 | 58.079 | 1.033076 | 375 to 318 (58) | 306.698 |
| 317.290–260.742 | 56.548 | 1.061045 | 317 to 261 (57) | 246.218 |
| 260.742–204.320 | 56.422 | 1.063415 | 260 to 205 (56) | 186.667 |
| 204.320–148.353 | 55.967 | 1.072060 | 204 to 149 (56) | 126.62 |
| 148.353–93.073 | 55.280 | 1.085384 | 148 to 94 (55) | 66.936 |
| 93.073–37.677 | 55.396 | 1.083111 | 93 to 38 (56) | 6.282 |

It can be seen from Table V that there is a maximum shift of 38.000−6.282=31.718 pixels to the left. Note that pixels beyond 38 cannot be stretched since there are no grid lines from which to estimate stretch factors. The pixels from 38 down to 0 are left exactly as they were this can be done by using a stretch factor of 1.0.

For offsets other than zero, cell sizes are determined by evaluating each polynomial at the scan line offset. The following example uses a y-offset of 10:

$$x_1 = 1311.666 + (0.025473)(10) + (-2.50169 \times 10^{-5})(10^2) + (1.23041 \times 10^{-9})(10^3) = 1311.918$$

$$x_2 = 1368.103 + (0.0300314)(10) + (-2.88221 \times 10^{-5})(10^2) + (4.64905 \times 10^{-10})(10^3) = 1368.400$$

measured cell size=$x_2 - x_1$=1368.400−1311.918=56.482 stretch factor=desired/measured=60.000/56.482=1.0622853

A portion of each contributing pixel is used to determine the intensities of stretched pixels. Each final pixel intensity value is determined by the intensity values of at least one but not more than two contributing pixels. When there is one contributing pixel, the intensity of the final pixel is not changed. When there are two contributing pixels, the sum of the fractional contributions is equal to one (1.00).

Figure 15:
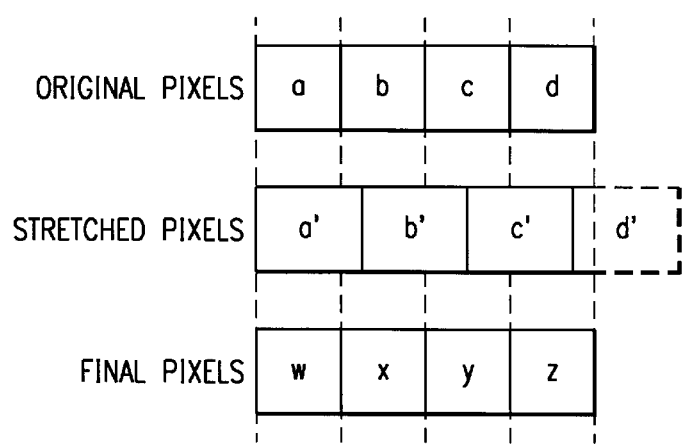
FIG. 15 shows a simplified form for stretching pixels horizontally.

FIG. 15 shows the stretching of 4 pixels horizontally using the simplified stretch factor of 1.25. In FIG. 15, stretched pixel a'=1.25*a, stretched pixel b'=1.25*b, stretched pixel c'=1.25*c, and stretched pixel d'=1.25*d. Pixels w, x, y, and z represent the final pixel. Since only pixel 'a' contributes to pixel 'w', the intensity value of pixel 'w' is equal to the intensity value of pixel 'a'. This can be denoted by w=1.00*a. Since pixels 'a' and 'b' contribute to pixel 'x', the intensity value of pixel 'x' is denoted by x=(0.25*a)+(0.75*b). Similarly, y=(0.5*b)+(0.5*c) and z=(0.75*c)+(0.25*d).

Once the stretch values for the grid have been calculated as described above, the results of the stretch computations are preferably written to one or more files, such as an x-map file and a y-map file. The files may be stored in a processor based system, such as a personal computer (PC). These files may be used to correct optical distortion in subsequent images, such as an x-ray image captured using an imaging sensor, such as a CCD camera.

Various references may be used for further explanation of digital images and various mathematical equations used in the present invention. Therefore, the following references are incorporated by reference herein: Hearn, D. and Baker, M. P., *Computer Graphics*, Prentice-Hall, Englewood Cliffs, N.J., 1986; Johnston, R. L., *Numerical Methods: A Software Approach,* John Wiley, New York, 1982; Kreyszig, E., *Advanced Engineering Mathematics,* $3^{rd}$ ed., John Wiley, New York, 1972; Riddle, D. F., *Calculus and Analytic Geometry*, Wadsworth Publishing, Belmont, Calif., 1970; and Russ, J. C., *The Image Processing Handbook,* $2^{nd}$ ed., CRC Press, Boca Raton, Fla., 1995.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for optical distortion correction in a digital image, comprising the steps of:

determining a size of a predetermined cell in said digital image, wherein said digital image is an image of a grid;

applying a correction to said determined cell size to account for non-alignment between said grid and an imaging sensor utilized to capture said digital image, if said non-alignment exceeds a predetermined value;

determining a plurality of sets of grid points of said grid;

fitting each set of said plurality of sets of grid points to a selected polynomial to provide a plurality of equations for grid lines of said grid; and adjusting values of pixels of said digital image based on said plurality of equations for grid lines of said grid so that selected cells of said grid are of substantially the same size, wherein said determining said size of said predetermined cell comprises the substeps of:

determining the distance between a first grid line in part forming said cell and a second grid line in part forming said cell utilizing a scan line, wherein said first and second grid lines are substantially parallel to each other, and said scan line is substantially orthogonal to said first and second grid lines, wherein said applying a correction step comprises the substeps of:

determining a rotational angle between a third grid line of said predetermined cell and said scan line used to determine said cell size, wherein a corrected cell size is equal to said determined cell size times cos(theta), wherein theta is said determined rotational angle.

2. The method of claim 1, wherein said predetermined cell is a cell with a least amount of distortion.

3. The method of claim 1, wherein said predetermined cell is the center cell.

4. The method of claim 1, wherein said size of said predetermined cell is the number of pixels from the center of a first grid line to the center of a second grid line, wherein said first and second grid lines are substantially parallel to each other and wherein said first and second grid lines in part form said predetermined cell.

5. The method of claim 4, wherein said first grid line is detected by sampling pixel intensity values along a center row of said digital image, wherein a pixel intensity value of said first grid line exceeds a threshold value.

6. The method of claim 4, wherein said second grid line is detected by sampling pixel intensity values along a center row of said digital image, wherein an intensity of a pixel of said second grid line exceeds a threshold value.

7. The method of claim 1, wherein said predetermined value is approximately 2.33 degrees.

8. The method of claim 1, wherein said determining a plurality of sets of grid points step comprises the substeps of:

detecting a horizontal grid line segment and a vertical grid line segment of said grid;

fitting said horizontal grid line segment to a first polynomial;

fitting said vertical grid line segment to a second polynomial; and determining a point of intersection between said first polynomial and said second polynomial, wherein said point of intersection is a grid point of said plurality of grid points.

9. The method of claim 8, wherein said first polynomial is selected from the group consisting of a linear polynomial, a quadratic polynomial, and a cubic polynomial.

10. The method of claim 8, wherein said second polynomial is selected from the group consisting of a linear polynomial, a quadratic polynomial and a cubic polynomial.

11. The method of claim 8, wherein said first polynomial is a cubic polynomial and said second polynomial is a cubic polynomial.

12. The method of claim 8, wherein said point of intersection between said first polynomial and second polynomial is determined by an iterative method.

13. A method for optical distortion correction in a digital image, comprising the steps of:

determining a size of a predetermined cell in said digital image, wherein said digital image is an image of a grid;

applying a correction to said determined cell size to account for non-alignment between said grid and an imaging sensor utilized to capture said digital image, if said non-alignment exceeds a predetermined value;

determining a plurality of sets of grid points of said grid;

fitting each set of said plurality of sets of grid points to a selected polynomial to provide a plurality of equations for grid lines of said grid; and adjusting values of pixels of said digital image based on said plurality of equations for grid lines of said grid so that selected cells of said grid are of substantially the same size, wherein said plurality of equations for grid lines includes a plurality of equations for vertical grid lines and a plurality of equations for horizontal grid lines, wherein the number of said plurality of equations of said vertical grid lines is less than or equal to the width of said grid divided by the determined cell size, wherein said adjusting step comprises the substeps of:

determining a vertical center of said image by dividing the width of said image by two;

measuring the distance between a first vertical grid line and a second vertical grid line, wherein said first and second vertical grid lines are on either side of a third line passing through said vertical center, wherein said first vertical grid line, said second vertical grid line and said third line are substantially parallel to each other; and calculating a horizontal stretch factor value, wherein said horizontal stretch factor value is given by the equation:

horizontal stretch factor value=desired cell size/measured distance.

14. The method of claim 13, further comprising the substep of:

applying said horizontal stretch factor to the pixels of at least one cell of said digital image so that the cell size of said cell is equal to said desired cell size, and wherein said at least one cell is formed at least in part by said first and second vertical grid lines and includes said vertical center.

15. The method of claim 14, further comprising the substep of:

changing the intensity value of said stretched pixels so that the final intensity value of each of said stretched pixels is partly a function of the intensity value of at least one adjacent pixel.

16. The method of claim 15, wherein said changing the intensity value step in part corrects optical distortion in said digital image.

17. The method of claim 1, wherein said imaging sensor is a digital CCD camera.

18. The method of claim 1, wherein said digital image is an x-ray image.

19. A method for correcting distortion in a digital image, comprising the steps of:

determining a plurality of stretch factors to be applied to pixels of said digital image, wherein each of said plurality of stretch factors is associated with a particular portion of said digital image;

storing said plurality of stretch factors in a mapping file associated with a processor based system; and adjusting values of pixels of said digital image based on said stored values, wherein said determining a plurality of stretch factors step comprises the substeps of:

determining a size of a preselected cell in a digital image of a grid;

applying a correction to said determined cell size to account for non-alignment between said grid and an imaging sensor utilized to capture said digital image of said grid, if said non-alignment exceeds a predetermined value;

determining a plurality of sets of grid points of said grid; and fitting each set of said plurality of sets of grid points to a selected polynomial to provide a plurality of equations for grid lines of said grid, wherein said plurality of equations for grid lines includes a plurality of equations for horizontal grid lines, wherein said determining a plurality of stretch factors step further comprises the substeps of:

determining a horizontal center of said image by dividing a height of said image by two;

measuring the distance between a first horizontal grid line and a second horizontal grid line, wherein said first and second horizontal grid lines are on either side of a third line passing through said horizontal center, wherein said first horizontal grid line, said second horizontal grid line and said third line are substantially parallel to each other; and calculating a stretch factor value of said plurality of stretch factor values, wherein said stretch factor value is given by the equation:

$$\text{stretch factor} = \text{desired cell size}/\text{measured distance}.$$

20. The method of claim 19, wherein said storing step comprises the substeps of:

writing said plurality of stretch factor values to one or more files; and storing said one or more files on a processor based system.

21. The method of claim 19, wherein said adjusting step further comprises the substep of:

applying at least one stretch factor of said plurality of stretch factors to the pixels of an associated portion of said digital image.

22. The method of claim 19, wherein said adjusting step further comprises the substep of:

changing the intensity value of pixels of a portion of said digital image so that the intensity value of each of said pixels is partly a function of the intensity values of at least one other pixel.

* * * * *